US007391523B1

(12) United States Patent
Taylor, II et al.

(10) Patent No.: US 7,391,523 B1
(45) Date of Patent: Jun. 24, 2008

(54) CURVATURE/TILT METROLOGY TOOL WITH CLOSED LOOP FEEDBACK CONTROL

(75) Inventors: Charles A. Taylor, II, Ann Arbor, MI (US); Darryl Barlett, Dexter, MI (US); Douglas Perry, Chelsea, MI (US); Roy Clarke, Ann Arbor, MI (US)

(73) Assignee: k-Space Associates, Inc., Ann Arbor, MI (US)

( * ) Notice: Subject to any disclaimer, the term of this patent is extended or adjusted under 35 U.S.C. 154(b) by 389 days.

(21) Appl. No.: 10/858,358

(22) Filed: Jun. 1, 2004

Related U.S. Application Data

(60) Provisional application No. 60/474,648, filed on Jun. 2, 2003.

(51) Int. Cl.
*G01B 11/24* (2006.01)
(52) U.S. Cl. .................. 356/612; 356/601; 356/445
(58) Field of Classification Search ............ 356/612, 356/613, 445, 129, 601; 250/559.2
See application file for complete search history.

(56) References Cited

U.S. PATENT DOCUMENTS

| | | | | |
|---|---|---|---|---|
| 4,291,990 A | * | 9/1981 | Takasu | .................. 356/613 |
| 4,929,846 A | * | 5/1990 | Mansour | ................ 356/613 |
| 5,078,496 A | * | 1/1992 | Parker et al. | ............ 356/613 |
| 5,912,738 A | * | 6/1999 | Chason et al. | .......... 356/601 |

* cited by examiner

*Primary Examiner*—L. G. Lauchman
*Assistant Examiner*—Rebecca C Slomski
(74) *Attorney, Agent, or Firm*—Jon E. Shackelford; Dickinson Wright PLLC

(57) ABSTRACT

Apparatus for quantitatively measuring the curvature and/or relative tilt of large surfaces wherein a small array of parallel laser beams, each separated by a known distance, reflect from the surface of a sample and fall upon a feedback controlled front-surface steering mirror to a detector that measures both the change in separation of the reflected beams and the spatial translation of the entire array on the detector. The sample surface is translated beneath or in front of the fixed laser array by means of a computer controlled stage or other apparatus to create a 1-dimensional line scan or 2-dimensional map of both bow and relative tilt of the sample surface. A computer-driven, feedback-controlled steering mirror compensates for varying sample tilt by precisely realigning the reflected laser array onto the detector as the sample is translated. The apparatus also utilizes a laser with intensity feedback control to continuously optimize the reflected laser power for varying surface reflectivity as the sample is translated. This combination provides a means to quantitatively measure curvature and relative tilt of sample areas much larger than the actual laser beam array size.

16 Claims, 5 Drawing Sheets

CURVATURE/TILT METROLOGY TOOL WITH CLOSED LOOP FEEDBACK CONTROL

PRIORITY CLAIM

This application claims the benefit of U.S. Provisional Application No. 60/474,648, filed Jun. 2, 2003.

FIELD OF THE INVENTION

The invention pertains to devices and methods for measuring the surface curvature and/or tilt of a surface utilizing detection and analysis of an array of laser beams directed to said surface.

BACKGROUND OF THE INVENTION

Certain materials, particularly semiconductor wafers, must be treated, manufactured, handled and otherwise processed with a very high level of precision. Various processing conditions can result in the creation of substantial stresses within the materials, and accordingly, evaluation of the surface curvature, tilt and roughness is useful in analyzing the potential for stress-related failure of such components during the manufacturing process. While measurement of the curvature of such surfaces for the purpose of determining stress levels has been attempted in a number of different forms, there is substantial room for improvement in existing techniques.

Typical of the current technology are the measurement apparatus and associated techniques disclosed in U.S. Pat. No. 5,912,738, issued to Chason, et al., and disclosing an apparatus for measuring the curvature of a surface using a plurality of parallel light beams which reflect from a surface and are directed to a detector to measure the separation of the reflected beams of light.

Additional methodologies are disclosed in U.S. Pat. No. 4,929,846, issued to Mansour, and U.S. Pat. No. 4,291,990, issued to Takasu. Further, an understanding of mechanical stresses in epitaxial films is discussed by Schell-Sorokin and Tromp, in Physical Review Letters, Vol. 64, number 9, Feb. 26, 1990.

Existing technology is adequate, in some circumstances, on smaller samples, and in conditions where it is not necessary to measure a selected area of a larger surface. However, even with the existing technology, there are serious limitations in that the existing technology is incapable of measuring the degree of tilt of a target surface, and there are no provisions in the current art for monitoring the measurement process and providing appropriate feedback. Likewise, current technology relies on large single arrays of parallel beams which are expensive to produce and require a corresponding increases in size of associated equipment to generate the necessary arrays.

Our invention overcomes these and other limitations in existing art, by providing a device which works well on large surfaces using a small array, incorporates unique feedback control, allows the measuring of a plurality of selected areas utilizing a repositionable sample stage, and which is capable of evaluating tilt and roughness as well as curvature.

BRIEF SUMMARY OF THE INVENTION

The invention is a device and method for quantitatively measuring the curvature and/or relative tilt of large surfaces, such as semiconductor wafers, utilizing a small array of ordered light beams, each separated by known distance, which reflect from the surface of a sample and are directed to a feedback controlled front surface steering mirror to a detector which is capable of measuring both the change in separation of the reflected beams and the spacial translation of the entire array on the detector. The information from selected areas of the sample may be collated into a continuous set of measurements across the entire surface of the sample.

The sample surface is translated beneath or in front of a fixed laser array by means of a computer-controlled stage or other apparatus which is capable of moving the sample surface in various axes to create a one-dimensional line scan or a two-dimensional map of both the curvature and relative tilt of the sample surface. A computer-driven, feedback controlled steering mirror compensates for varying sample tilt by precisely realigning the reflected laser array onto the detector as the sample is translated. The invention also utilizes a laser with intensity feedback control to continuously optimize the reflected laser power for varying surface reflectivity as the sample is translated. This combination provides a means to qualitatively measure curvature and relative tilt of sample areas much larger than the actual laser beam array size.

DETAILED DESCRIPTION OF THE INVENTION

Figure 1:
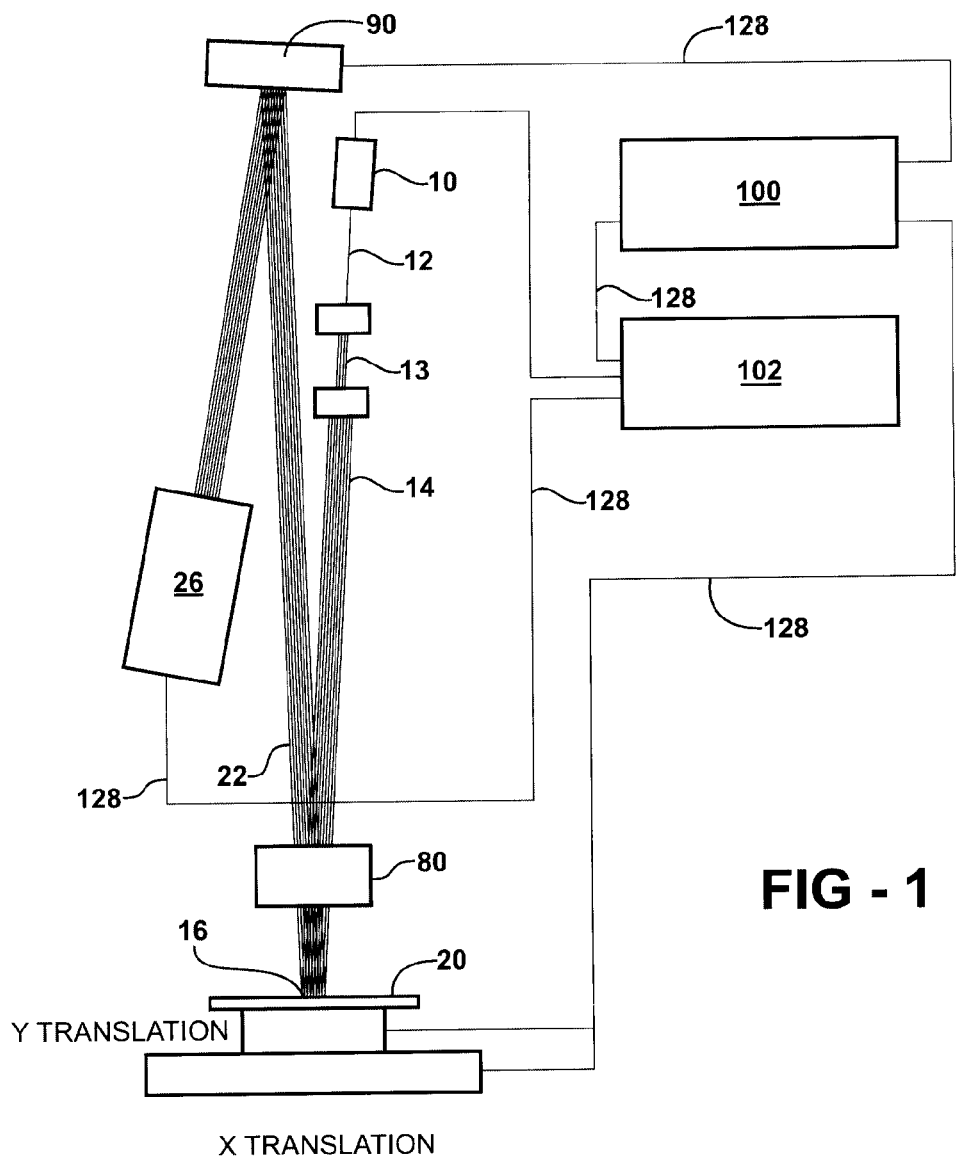
FIG. 1 is a schematic view of the invention showing the interrelation of the components, the laser beam, and the electronic circuits.
Figure 2:
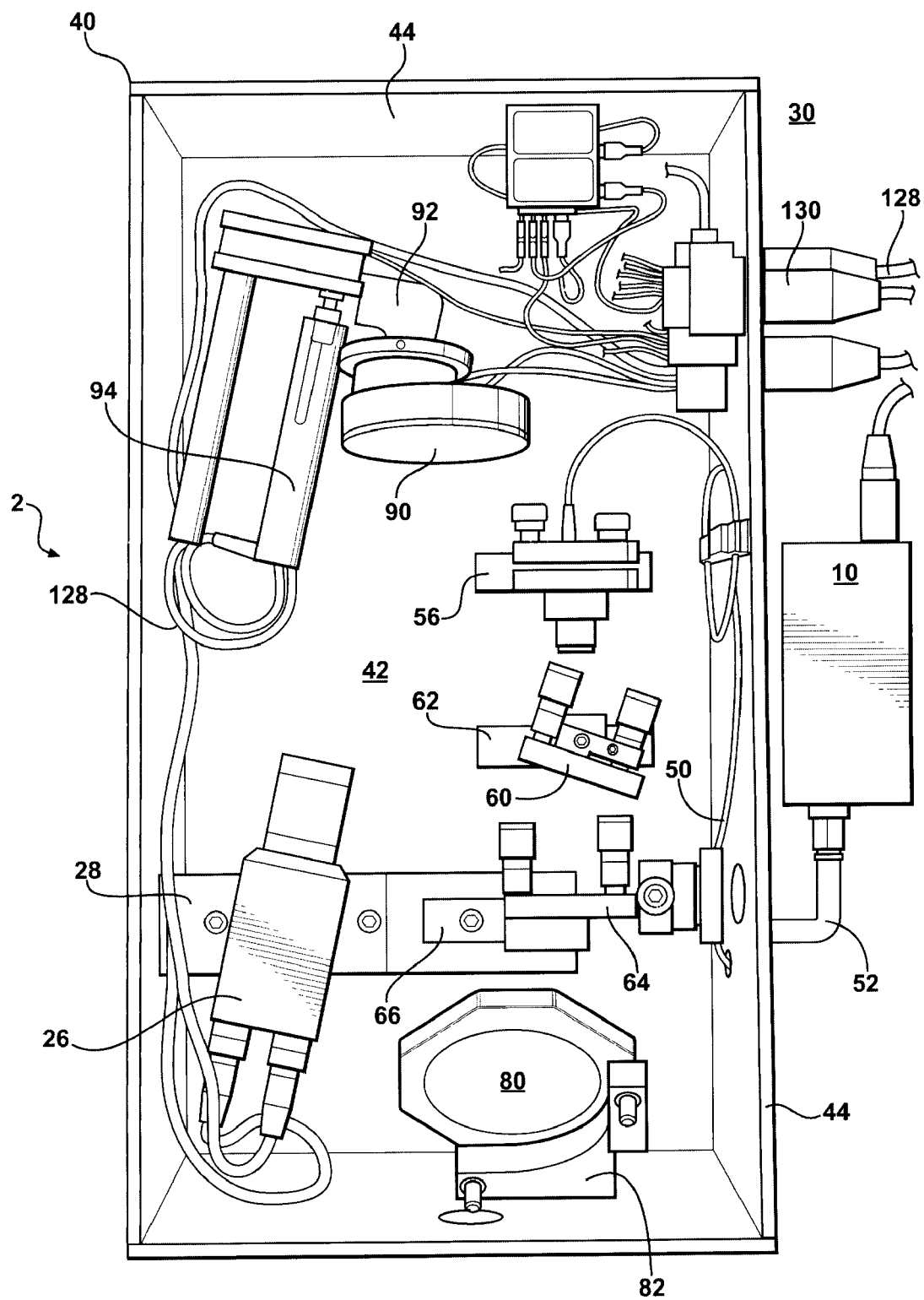
FIG. 2 is a top perspective view of the optical portions of the invention showing their relative placement on the optical stage.
Figure 3:
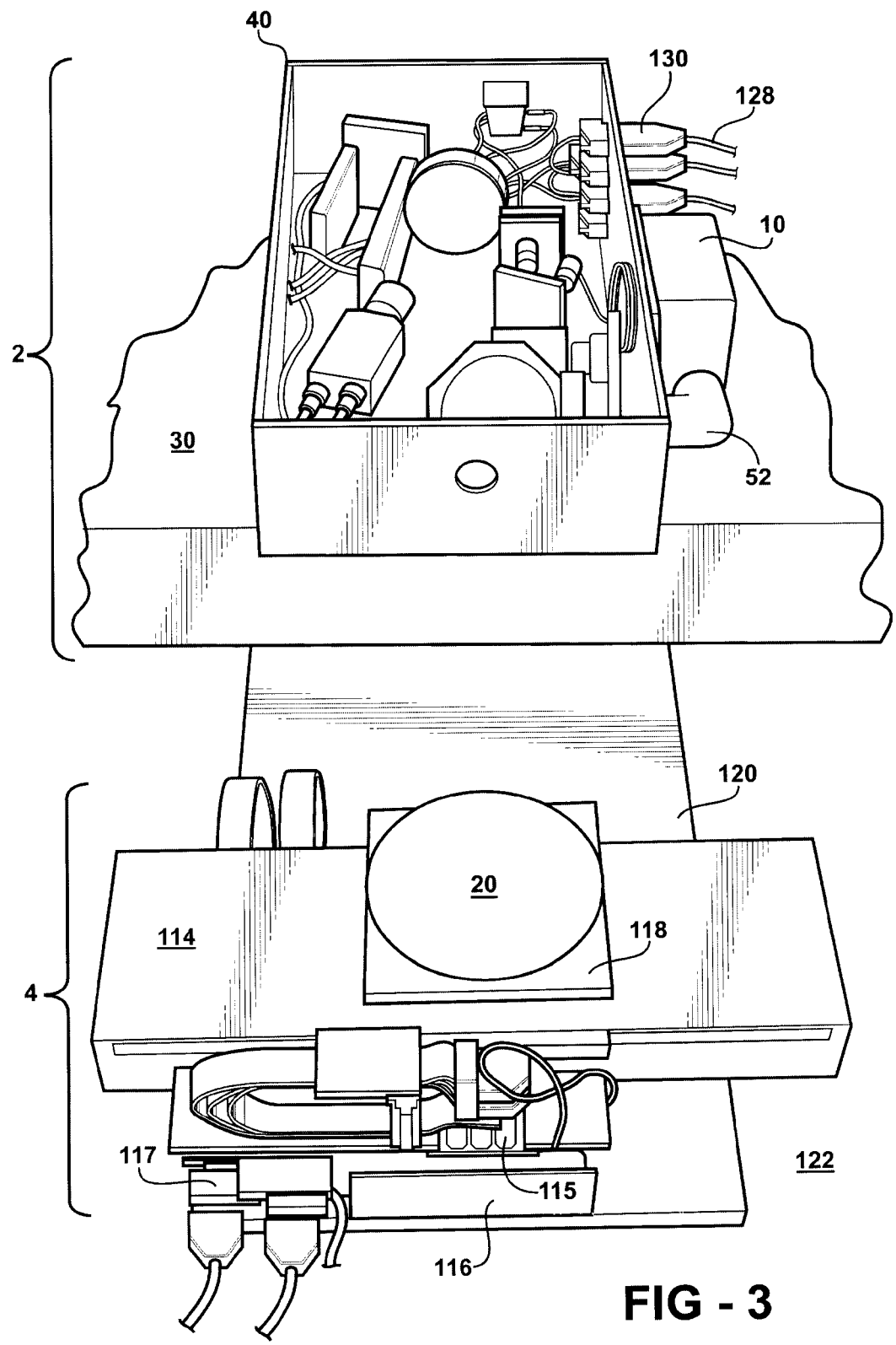
FIG. 3 is a perspective view of optical stage and the scanning stage of the invention showing the respective placement of their components and the placement of each stage.

The apparatus and method described herein will be best understood by reference to FIGS. 1-5. The principal optical elements of the system are found in FIG. 2. The principal scanning elements are shown in FIG. 3.

The structure and layout of the various elements of the optical stage 2 will be best understood by reference to FIG. 1 and FIG. 2. The principal elements of the optical stage 2 are mounted to the interior and exterior of enclosure 40, which, in turn, is mounted to a supporting surface 30, such as a table, positioning jig, or similar structure designed to provide a secure substrate to which to mount the optical stage enclosure 40. It is highly desirable to insure that all elements of the system are as immobile as possible, and immune from any degree of external vibration to insure that the laser beam array later described is not subject to imparted motion by virtue of vibration in the environment. The enclosure 40 is preferably of lightweight but rigid metallic material, such as aluminum or steel or alloys thereof. Enclosure 40 may be permanently or removably secured to supporting surface 30. Enclosure 40 comprises a base 42, a plurality of side walls 44 and a cover (not shown), which, when affixed to the side walls 42 creates a substantially light-proof and dust-proof enclosure 40. The various sub-components of the optical stage 2 are, as will be described, affixed to the enclosure 40.

In the present embodiment, a laser source 10 is affixed to the exterior of one of the side walls 44 of enclosure 40. It will be appreciated, however, that by changing the size of enclosure 40, sufficient interior volume of enclosure 40 may be provided to permit laser source 10 to be mounted to the interior of enclosure 40 if desired. Laser source 40 may be one of a wide variety of commercially available laser light sources, typically those utilizing laser diodes or helium neon laser technology, which, when appropriately powered, provides a continuos wave laser light output in the form of a beam of collimated light which laser beam 12 may be visible or invisible, depending on the desired wavelength. Pulsed lasers may also be used. The wavelength of laser light may be selected to optimize performance of the invention depending on the type of material to be measured. The laser beam 12 so generated is then presented as an input to optical fiber 50, the input end of which is preferably encased in an optical fiber guide 52 to provide support and protection for the optical fiber 50. The optical fiber 50 is flexible, allowing it to be easily routed from the optical fiber guide 52 to the next element of the optical stage 2. The output end of the optical fiber 50 is secured to an optical fiber output support 56 which secures and positions the output end of the optical fiber 50 in fixed relationship to the enclosure 40 and the remaining optical components of the optical stage 2. Positioned adjacent the optical fiber output support 56 is a first etalon 60 which is secured to the enclosure 40 utilizing first etalon support 62. Again, the first etalon 60 and support 62, like all elements the optical stage 2 are firmly secured through their various supports to the enclosure 40 to provide a highly secure platform for each element of the optical stage 2. First etalon 60 separates the laser beam 12 into a one dimensional array 13 of parallel laser beams which are then directed to a second etalon 64 which is secured to second etalon support 66. Second etalon transforms the one dimensional laser beam array 13 into a two dimensional laser beam array 14. The number of individual elements for each dimension of the laser beam array is determined by the type of first etalon 60 and second etalon 64 selected, as will be described further herein. Etalons 60 and 64 may be solid, air-spaced or computer-controlled optically encoded types. And, while conventional etalons are preferred as the means for creating the parallel beam arrays, the arrays may also be created by contoured lens optics, periodic or quasi-periodic grating optics.

In the preferred embodiment, the laser beam array 14 so generated is directed onto the surface of a first fixed alignment mirror 80, which, in turn, is securely mounted to the first fixed alignment mirror support 82 which is affixed to the enclosure base 42. The array 14 from first fixed alignment mirror 80 is directed to sample 20. Sample 20 is typically a semiconductor wafer undergoing testing by the apparatus and method of the invention. Semiconductor wafer 20 may exhibit various surface irregularities, and the laser beam array 14 above described is analyzed to ascertain its reflected characteristics from the surface of the sample 20. The laser beam array 14 is directed to a target area 16 on the surface of sample 20. The laser beam array 14 so directed is then reflected back to the optical stage 2. The sample 20 may be positioned by virtue of the various elements of the scanning stage 4 which will be described herein. The reflected array 22 is directed by fixed alignment mirror 80 to a steering mirror 90. Steering mirror 90 is mounted to the base 42 of enclosure 40 by virtue of a steering mirror mount 92 which is provided with steering mirror servos 94. Steering mirror mount 92 may also consist of a rotational portion attached to a fixed portion to allow mount 92 to be rotated under servo control. Steering mirror servos 94 permit the steering mirror 90 to be articulated and aimed, allowing the reflected array 22 to be controllably directed to laser beam array detector 26. Laser beam array detector 26 is secured to the base of enclosure 42 by a detector support 28. Detector 26 is preferably in the form of a CCD array-type detector, which is capable of providing a precise map of the reflected array 22 as presented to the internal sensing array of the CCD detector. The output from the detector 26 is then transmitted to the computers and controllers which will be described herein.

With reference now to FIG. 3, the various components of the scanning stage 4 will be understood. In one embodiment of the invention, the scanning stage 4 is secured adjacent to and below the optical stage 2. This permits the entire scanning stage 4 to be secured to the floor 122 of the facility in which the invention is utilized, or to the base of the structure to which the optical stage 4 is mounted. The use of floor-mounting is often preferable to insure that the scanning stage 4 is subjected to the minimum amount of environmental vibration.

Figure 1A:
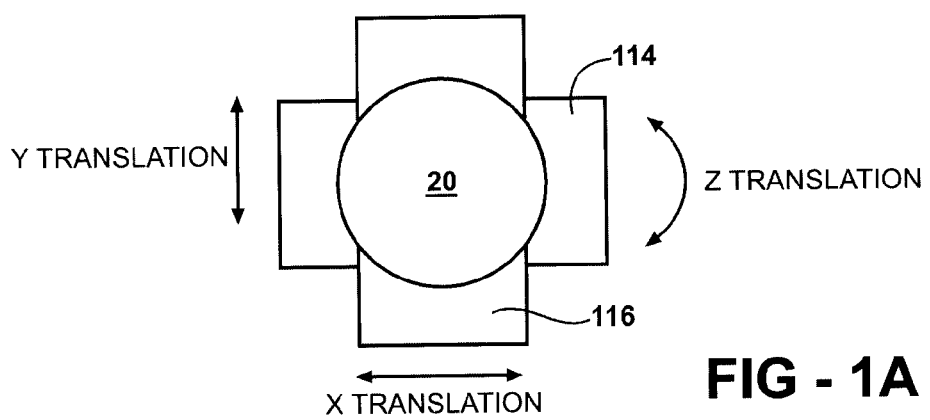
FIG. 1A is a simplified schematic view of the sample carrier showing the axis of movement of the sample.

In this embodiment, the scanning stage 4 utilizes a primary support 120 which may be in the form of a plate or bracket which may be secured to the floor 122 of the facility in which the invention is used, the primary support 120 providing the primary base on which the remaining elements of scanning stage 4 are mounted. The sample 20 is secured to a sample holder (not shown), which, in turn, is secured to a z translation carrier 118. Z translation carrier 118 is provided with a servo (not shown) which permits rotation of the z translation carrier. Z translation carrier, in turn, is mounted to a y translation carrier 116, which, in turn, is provided with y translation carrier servo assembly 117 which permits movement of the entire z translation carrier in the y axis as shown in FIG. 1A. Mounted to the y translation carrier 116 is the x translation carrier 114, which, in turn, is provided with x translation carrier servo assembly 115. The various servo assemblies so described include servo motors to permit the various carrier so described to be moved in the x, y and z (rotational) axis as shown in FIG. 1A. In this fashion, the sample 20 may be selectively positioned so that any specific target area 16 of the sample 20 can be presented to the laser beam array 14 generated by the optical stage 2.

All of the movement of the servo motors for the sample carriers 114, 116 and 118, as well as the servos 94 for the multi-axis steering mirror 90 are controlled by and provide feedback to a multi-action motion controller circuit 100. This circuit contains the necessary drivers to provide appropriate power and signals to the various servo motors to selectively position the x translation carrier 114, y translation carrier 116 and z translation carrier 118, as well as the steering mirror 90, and further provides the necessary circuitry to sense the positions of each of said servo motors, and to transmit those positions to a computer 102, which is typically in the form of a preprogrammed micro controller or a conventionally available personal computer. The computer 102 is further connected to the laser source 10 and the detector 26. Computer 102 can accordingly control the output of the laser source 10 while simultaneously monitoring the output of the detector 26. Wiring harnesses 128 and electrical connectors 130 are utilized to interconnect the circuit 100, computer 102, the various servo motors, the laser source 10 and the detector 26, and enable feedback to be obtained from the various components as to both position and intensity of the laser beam array 14 as it is presented to the sample 20 and reflected back as reflected array 22 to the detector 26.

The elements of optical stage 2 and scanning stage 4 derive their power from a conventional electrical power source (not shown) utilized to activate the various servos, and to energize the laser source 10, the detector 26, the multi-action motion controller 100 circuitry and the computer 102.

A laser light source 10 of conventional manufacture provides the primary laser beam 12 for the invention. Controllable laser light output from the laser source 10 is directed through an optical fiber 50, which, in turn, terminates at a laser output where the laser beam 12 is then presented to a first etalon 60, the output of which is presented to a second etalon 64 resulting in the emission from the second etalon 64 of a two-dimensional laser beam array 64 of a plurality of parallel laser light beams. The dimension of the array 14 is typically 3×3, 4×4, 5×5 or 6×6, however, any dimension may be used within the limits of the size of the optics incorporated in the device. The laser beam array 14 is reflected from fixed alignment mirror 80 to a multi-axis steering mirror 90. The orientation of the steering mirror 90 is controlled by a plurality of servos 94 to position the reflected array 22 onto the internal sensing elements of the detector 26.

The steering mirror 90 is controlled by a multi-axis motion controller circuit 100, which, in turn, derives its input from a computer 102 which communicates with both the laser source 10 and the detector 26.

The process of positioning the sample will be appreciated by reference to FIG. 3, which shows the scanning stage 4 and a sample 20 disposed thereon. It will be appreciated from FIG. 3 that the scanning stage 4 is movably mounted on a support 120 which permits the sample 20 to be moved in the x-axis and y-axis under the control of servo assemblies 115, 117, affixed to the support. In addition, the sample 20 is mounted on a rotational carrier 118 which allows z-axis translation of the sample 20 as well.

The measuring process is performed by monitoring the sample 20 as the array 14 of parallel laser beams is directed onto the sample 20. Under the direction of the computer 102 and the controller 100, the position of the two-dimensional laser array 14 may be steered to a particular position of the sample 20, in much the same fashion as an electron beam may be steered across the face of a cathode ray tube.

The intensity and orientation of the reflected laser beams provides accurate determination of surface qualities, including surface film thickness, growth rate and optical constants. The laser array 14 also provides information on stress, and can be used for curvature profiling.

The laser array 14 as detected is analyzed by a series of algorithms to analyze radius of curvature, tilt and other topographical qualities as to any segment on the sample being measured.

Utilizing advanced data acquisition routines in software, the output so analyzed may be selectively filtered, sampled and externally triggered. The software is capable of generating real time output in the form of both video display terminal output as well as printed data charts which will be useful in analyzing stresses, strains, radius of curvature and other variables associated with the sample.

Figure 5:
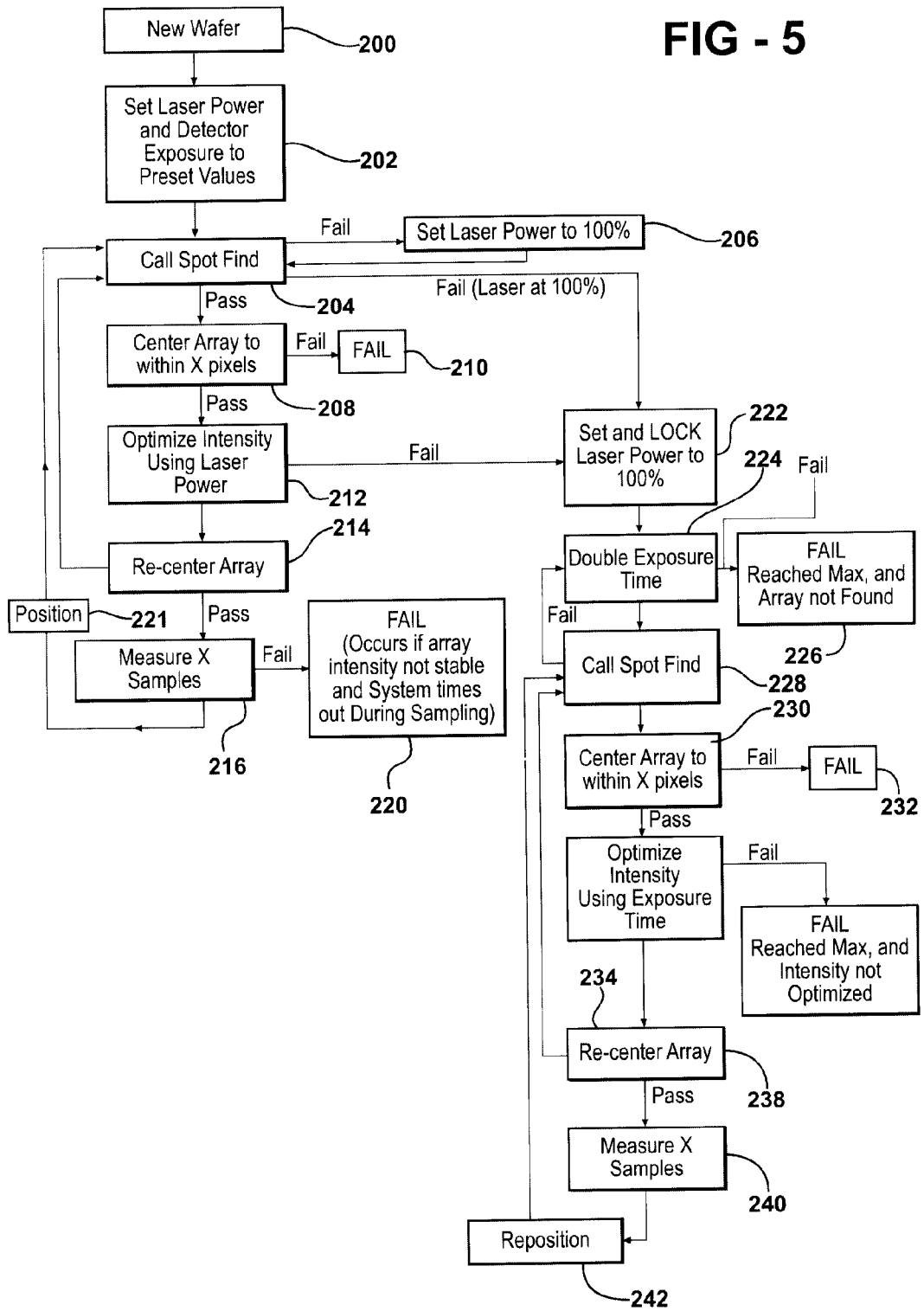
FIG. 5 is a flow chart demonstrating the measurement process showing the interrelation of the laser control, mirror control, detector exposure control, control of the scanning stage and feedback.

FIG. 5 provides a flow chart of the measuring routine in detail. The routine begins with the placement 200 of a new wafer on the scanning stage of the invention. The next step involves setting the laser output and detector exposure to preset values at process step 202.

The computer is then instructed to initiate the "spot find" subroutine process 204. This computer program subroutine analyzes the detector 26 output to determine whether or not the array 14 is being presented to the detector 26. If no array 14 is located, the routine flow proceeds to process 206, which involves resetting the laser source to 100% power. Following this step, the routine returns to the "spot find" process 204.

Assuming that the "spot find" process 204 is successful in verifying the presence of the array 14 on the detector 26, the next step in the routine is to center the array 14 in the center of the CCD array of the detector 26 within a predetermined tolerance. This centering process 208 is performed utilizing the steering mirror and its associated servos. If the process 208 is unsuccessful in being able to center the array 14, the measuring routine is terminated at process 210 based on the presumed failure of either the wafer or one or more aspects of the hardware of the optical stage or the scanning stage.

If the array centering process 208 is successful, the routine then continues to process step 212, wherein the intensity of the laser output is optimized by analyzing the intensity of the individual elements of the array 14 on the internal sensing elements of the detector 26. If any portion of the CCD sensing elements is saturated, the laser power is incrementally lowered until no area of the detector sensor elements is saturated.

After optimizing the laser power intensity, the next process step 214 is a recentering of the array 14 again using the steering mirror 90. The process steps 204, 208, 212 and 214 are repeated until the optimal intensity of the laser power has been reached and the array is centered in the CCD detector array. Once these conditions have been met, the array 14, now presumed to be perfectly centered and at the correct intensity, is evaluated by comparison to a previously established reference file, and the variation in position of the actual array elements is compared to a stored standard in process 216. This data is then recorded. If for any reason process step 216 fails to produce a stable intensity, the routine terminates at process step 220. If, on the other hand, adequate array stability is obtained, the scanning stage of the invention is instructed to increment the position of the wafer to a new physical location, and the entire above routine is repeated until the requisite number of measurements has been taken. The routine then moves to the reposition process 221 to reposition the sample.

Should the "spot find" subroutine of process 206 fail, the routine branches to process step 222, which sets and locks the laser power to a maximum, and thereafter to process step 224, which effectively doubles the detector 26 exposure time. The routine then calls the "spot find" process 228 to determine whether or not the array 14 can be detected by the detector 26. If not, the routine branches to process step 224 to again double the exposure time. Following the process step 224, the detector exposure time is tested at decision process 226 to determine if the maximum exposure time has been reached and an array 14 has still not been located in the detector 26.

Assuming that the "spot find" process 228 is successful in validating the presence of the array 14 on the detector, the next step in the process 230 centers the array 14 to within a predetermined tolerance. If the centering process 230 is unsuccessful, the measurement is determined to be unsuccessful, and the routine fails at process step 232. If, on the other hand, the center array process 230 is successful, the routine continues to process step 234 wherein the exposure time of the detector is adjusted to eliminate over-saturation of any portion of the detector 26 array. If the optimization process 234 is not successful, the routine fails at process step 236. If the intensity of the array 14 can be optimized at process step 234, the routine continues to process step 238 wherein the array 14 is recentered, again utilizing the steering mirror 90. Once the intensity in position of the array 14 has been confirmed, the routine continues to process step 240 wherein the position of the array elements is compared to the known standard, and the variation between the two is reported and the data stored. Once this routine has been completed, the next process step 242 is to reposition the location of the array on the surface of the wafer and return to the "spot find" subroutine process at process 228.

Figure 4A:
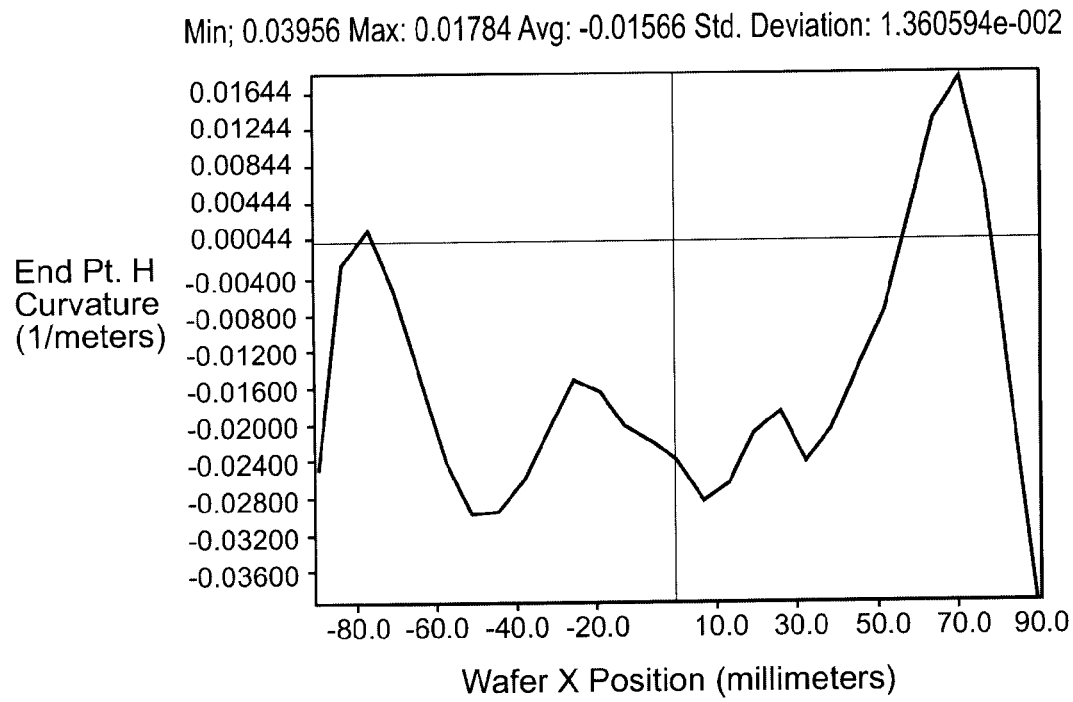
FIG. 4A is a graph of the typical data output obtained from the application of the inventive method and apparatus to a sample.
Figure 4B:
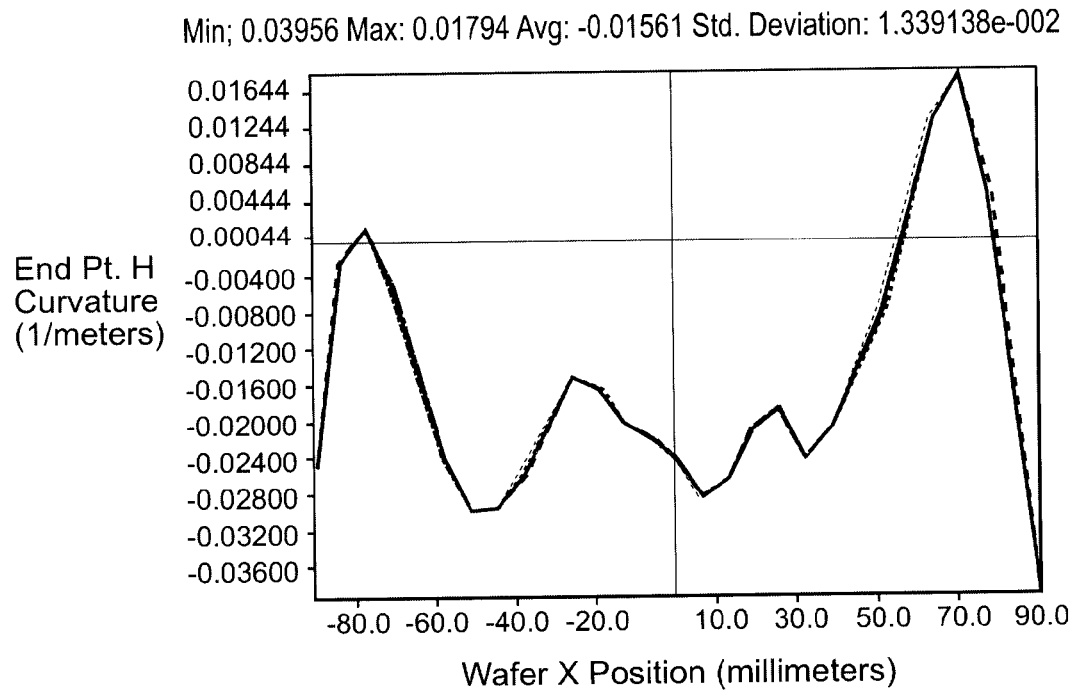
FIG. 4B is a graph of data generated from 10 successive applications of the invention to a sample.

The variations in the curvature of the surface thus obtained are shown in graphic representation in FIG. 4A. The x axis of the graph designates the position of the sampling array across a range of separate sampling points linearly spaced across the surface of a sample wafer. The y-axis of the graph charts the dimensional curvature. As can be seen from FIG. 4B, which represents 10 successive scans taken across the same portions of a sample wafer the near-perfect overlap demonstrates a high degree of repeatability of results utilizing our invention.

Having thus described our invention, numerous modifications may be made thereto without departing from the invention which we claim as follows:

1. An apparatus for determining the curvature, relative tilt and/or surface quality of a sample by sequentially analyzing fractional portions of the sample surface, said apparatus comprising:
   a laser source that produces a single beam of laser light;
   an optical splitting device that transforms said single laser beam into an incident array of plural, parallel laser beams separated one from another by a known distance;
   alignment optics that directs said incident array toward a discrete fractional portion of the sample surface and reflecting therefrom a reflected array of laser beams;
   a detector positioned to receive said reflected array that measures the position of individual laser beams in said reflected array to calculate curvature, relative tilt and/or surface quality of the fractional portion of the sample surface;
   means for preventing over-saturation of said detector by controlling at least one of the light sensitivity of said detector and the light intensity of said incident array;
   a data processor;
   scanning means that moves said incident array relative to the sample surface to progressively scan sequential fractional portions of the sample surface while said data processor compiles a continuous map of the sample surface curvature, relative tilt and/or surface quality; and
   steering optics disposed optically between the sample surface and said detector that continually aims said reflected array onto said detector, whereby when defects in the sample surface cause said reflected array to stray out of alignment, the array is steered back to a targeted condition upon said detector for continuous measurement while a map is compiled of the sample surface curvature, relative tilt and/or surface quality.

2. The apparatus of claim 1 wherein said optical splitting device comprises an etalon.

3. The apparatus of claim 2 wherein said etalon includes at least two movable elements separated by a space and an angle.

4. The apparatus of claim 2 wherein said etalon comprises a solid or air-spaced etalon.

5. The apparatus of claim 4 wherein said etalon includes a periodic or quasi periodic grating optic.

6. The apparatus of claim 1 wherein said scanning means includes a servo operated positioning device controlled by a computer.

7. The apparatus of claim 6 wherein said servo operated positioning includes at least one linear translation stage for supporting the sample.

8. The apparatus of claim 6 wherein said servo operated positioning includes at least one rotational translation stage for supporting the sample.

9. The apparatus of claim 1 wherein said means for preventing over-saturation of said detector includes a feedback control loop from said detector to said laser source.

10. The apparatus of claim 1 wherein said steering optics includes a computer controlled steering mirror.

11. The apparatus of claim 10 further including a rotational mount for rotatably supporting said steering mirror relative to said reflected array.

12. A method for determining the curvature, relative tilt and/or surface quality of a sample by sequentially analyzing fractional portions of the sample surface, said method comprising the steps of:
   producing a single laser beam;
   transforming the single laser beam into an incident array of plural, parallel laser beams separated one from another by known distances;
   directing the incident array toward a discrete fractional portion of the sample surface and reflecting therefrom a reflected array of laser beams;
   detecting the position of each individual laser beam in the reflected array using a detector;
   calculating the curvature, relative tilt and/or surface quality of the fractional portion of the sample surface;
   progressively scanning sequential fractional portions of the sample surface by moving the incident array relative to the sample surface;
   compiling a continuous map of the sample surface curvature, relative tilt and/or surface quality; and
   optically manipulating the reflected array to continually aim the reflected array onto the detector, whereby the reflected array is steered back to a targeted condition upon the detector in the event a surface defect or other condition on the sample surface causes the reflected array to stray out of alignment.

13. The method of claim 12 wherein said step of transforming the single laser beam into an incident array of laser beams includes producing a two-dimensional array of laser beams.

14. The method of claim 12 further including the step of preventing light over-saturation in the detector by controlling at least one of the light sensitivity of the detector and the light intensity of the incident array.

15. The method of claim 12 wherein said step of optically manipulating the reflected array includes aiming the reflected array with a steering mirror.

16. The method of claim 15 wherein said step of aiming the reflected array with a steering mirror includes moving the steering mirror relative to the detector.

* * * * *